United States Patent [19]
Noah et al.

[11] Patent Number: 5,226,675
[45] Date of Patent: Jul. 13, 1993

[54] FIFTH WHEEL SUSPENSION

[75] Inventors: Bruce C. Noah, W. Lafayette, Ind.; William H. Fouch, Crystal Lake, Ill.

[73] Assignee: TRW Inc., Lyndhurst, Ohio

[21] Appl. No.: 708,685

[22] Filed: May 31, 1991

[51] Int. Cl.$^5$ .............................................. B62D 53/06
[52] U.S. Cl. ..................................................... 280/439
[58] Field of Search ..................... 280/438.1, 439, 433, 280/440, 704, 705, 407, 407.1, 446.1, 405.1

[56] References Cited

U.S. PATENT DOCUMENTS

| | | | |
|---|---|---|---|
| 3,494,632 | 2/1970 | Bostrom | 280/407.1 X |
| 4,580,806 | 4/1986 | Kolstad et al. | 280/407 |
| 4,861,060 | 8/1989 | Schult et al. | 280/439 |
| 4,898,257 | 2/1990 | Brandstadter | 280/705 X |
| 4,955,631 | 9/1990 | Meyer | |

*Primary Examiner*—David M. Mitchell
*Assistant Examiner*—Florian Zeender
*Attorney, Agent, or Firm*—Tarolli, Sundheim & Covell

[57] ABSTRACT

An apparatus for reducing the magnitude of changes in a vertical force transmitted to a tractor from a trailer through a fifth wheel hitch. The changes in vertical force are caused by the trailer reacting as an inertial mass as the trailer is moved over uneven pavement during pulling of the trailer by the tractor. The apparatus includes a sensor for providing a signal. The signal is indicative of the vertical force transmitted from the trailer through the fifth wheel hitch. An actuator is disposed between the fifth wheel hitch and the tractor. The actuator applies a vertical force to the fifth wheel hitch and the tractor. A control device operates the actuator for varying the amount of vertical force applied to the fifth wheel hitch by the actuator. The operation of the actuator is responsive to the signal indicative of the vertical force transmitted from the trailer through the fifth wheel hitch.

13 Claims, 2 Drawing Sheets

FIFTH WHEEL SUSPENSION

BACKGROUND OF THE INVENTION

The present invention relates to a suspension system for a fifth wheel hitch mounted on a truck tractor for pulling a trailer.

A trailer is connected to a truck tractor at what is termed a fifth wheel hitch. The force transmitted from the tractor to the trailer for pulling the trailer is transmitted through the fifth wheel hitch. Also, a vertical force is applied to the tractor by the trailer through the fifth wheel hitch. In a static condition, the force applied by the trailer to the tractor will be a constant vertical downward force. The magnitude of the constant vertical downward force will depend on the weight of the trailer and the weight of any cargo carried by the trailer.

During the pulling of the trailer by the tractor, the trailer is subjected to uneven pavement, such as pot holes, bumps, etc. The trailer reacts to the uneven pavement as an inertial mass. Such reaction causes a change in the amount of vertical force transmitted from the trailer to the tractor at the fifth wheel hitch. The variation in the vertical force transmitted to the tractor from the trailer due to uneven pavement disturbs the tractor causing poor ride and poor handling conditions. It is desirable to reduce the variation in the vertical force transmitted from the trailer through the fifth wheel hitch to the tractor due to the trailer encountering uneven pavement.

SUMMARY OF THE INVENTION

The present invention is an apparatus for reducing the magnitude of changes in the vertical force transmitted to a tractor from a trailer through a fifth wheel hitch. The changes in the vertical force transmitted to the tractor from the trailer through the fifth wheel hitch are caused by the trailer reacting as an inertial mass as the trailer is moved over uneven pavement during the pulling of the trailer by the tractor.

In accordance with the present invention a sensor provides a signal indicative of the vertical force transmitted from the trailer through the fifth wheel hitch. An actuator is disposed between the fifth wheel hitch and the tractor. The actuator applies vertical force to the fifth wheel hitch and the tractor. A control means operates the actuator. The control means operates the actuator to apply a vertical force to the fifth wheel hitch which varies in magnitude in response to the signal indicative of the vertical force transmitted from the trailer through the fifth wheel hitch.

BRIEF DESCRIPTION OF THE DRAWINGS

The foregoing and other objects and features of the present invention will become more apparent to one skilled in the art upon a consideration of the following description and the accompanying drawings in which.

DESCRIPTION OF A PREFERRED EMBODIMENT

Figure 1:
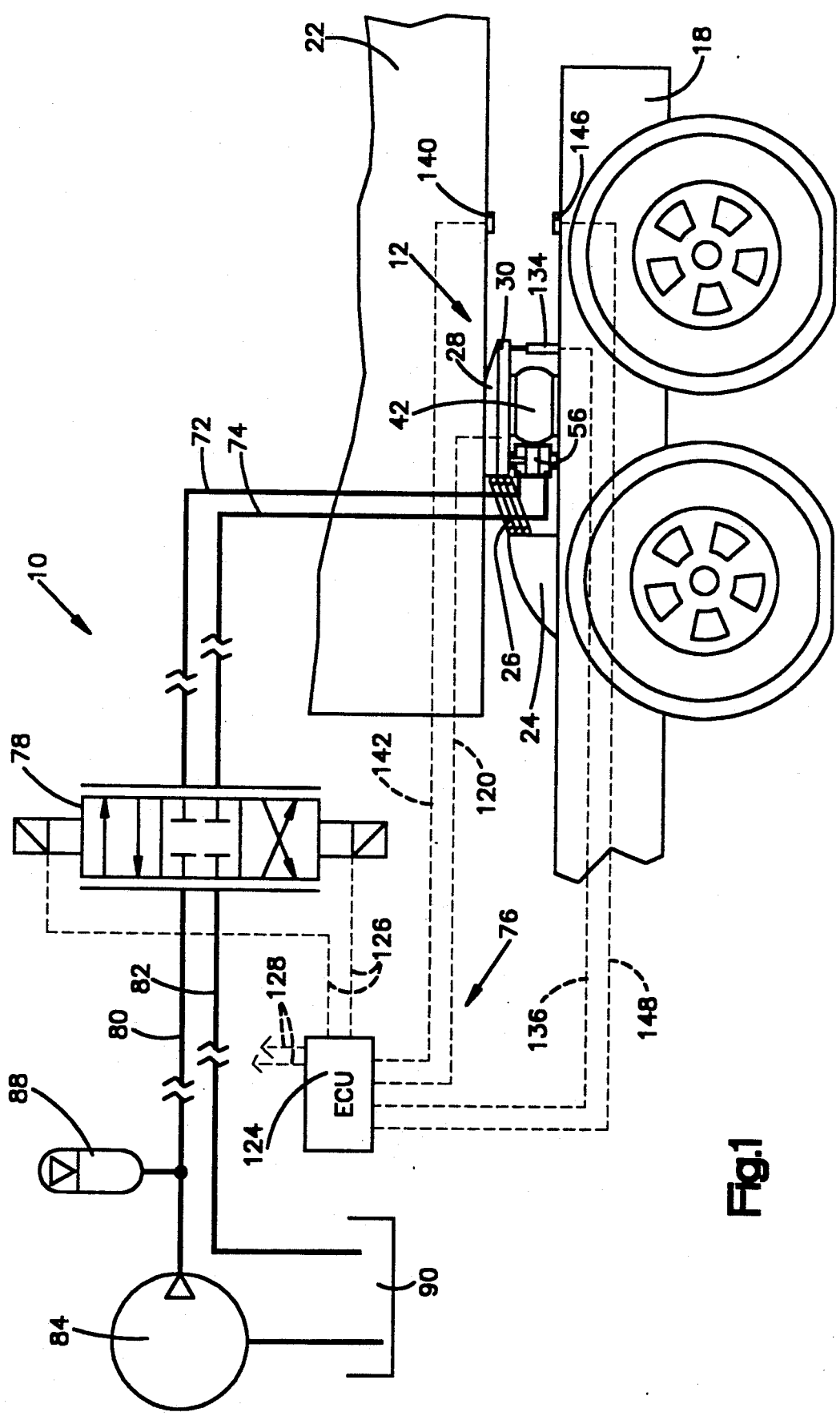
FIG. 1 is a schematic illustration of an apparatus embodying the present invention.

The present invention is an apparatus for reducing the magnitude of change in a vertical force transmitted through a fifth wheel hitch from a trailer to a tractor which pulls the trailer. The specific structure of the apparatus may take a variety of forms. As representative, FIG. 1 illustrates an apparatus 10 for reducing the magnitude of change in the vertical force transmitted through a fifth wheel hitch 12.

The fifth wheel hitch 12 is disposed on a tractor 18. A trailer 22 is partially supported by and coupled to the fifth wheel hitch 12. A constant vertical force is transmitted to the tractor 18 from the trailer 22 through the fifth wheel hitch 12 when the tractor 18 and the trailer 22 are stationary. The magnitude of the constant vertical force depends on the weight of the trailer 22 and the weight of any cargo carried by the trailer 22.

The trailer 22 is pulled by the tractor 18 by force transmitted to the trailer 22 through the fifth wheel hitch 12. The pulling force of the tractor 18 is transmitted by a tractor frame extension 24. The frame extension 24 is rigidly connected to the tractor 18. A linkage 26 is connected at one end to the frame extension 24. The linkage 26 is connected at the other end to a fifth wheel hitch plate 28. The linkage 26 transmits horizontal pulling force from the frame extension 24 of the tractor 18 to the fifth wheel hitch plate 28. The linkage 26 is pivotable in a vertical direction. The pivoting permits vertical displacement of the fifth wheel hitch plate 28 relative to the tractor 18. The linkage 26 can be any suitable known connector.

The trailer 22 is connected to the fifth wheel hitch plate 28. The connection between the trailer 22 and the fifth wheel hitch plate 28 provides an articulated connection such that the tractor 18 and the trailer 22 can pivot relative to each other for steering maneuverability, as is known in the art.

Figure 2:
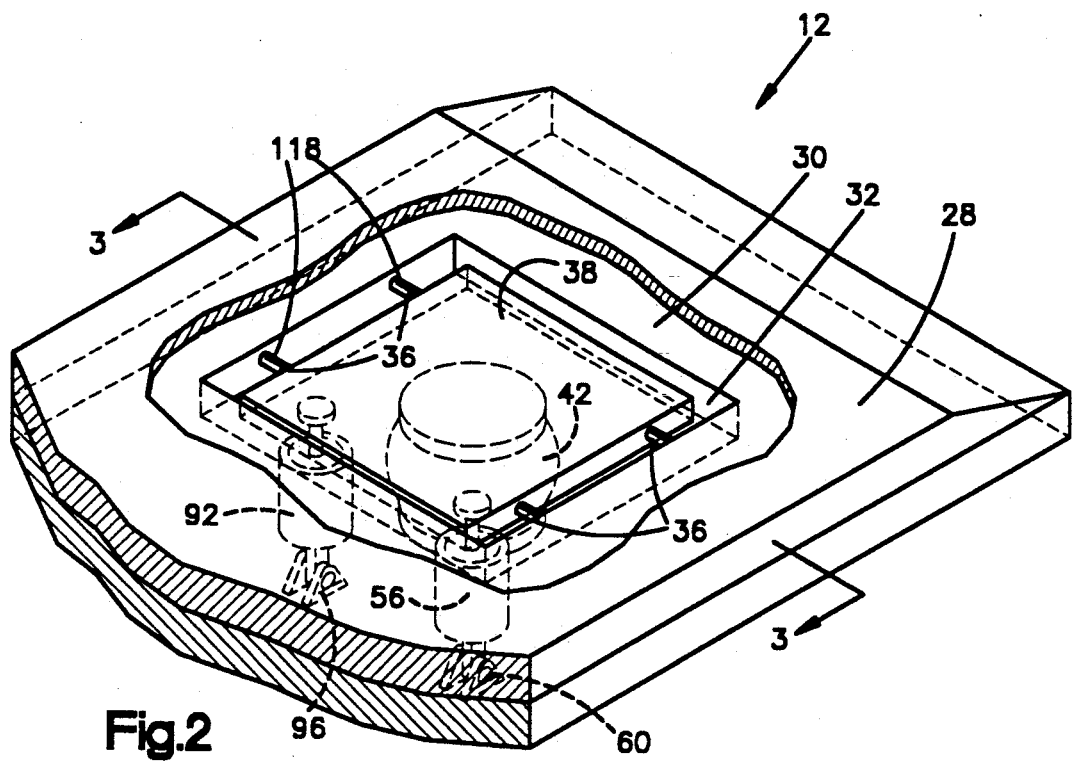
FIG. 2 is a partially broken away, schematic illustration of a portion of the apparatus of FIG. 1.

Disposed below the fifth wheel hitch plate 28 is a transmitting member 30. The transmitting member 30 is rigidly connected (such as by welding) to the fifth wheel hitch plate 28. Vertical force is directly transmitted between the fifth wheel hitch plate 28 and the transmitting member 30. The transmitting member 30 has a central opening 32 (FIG. 2). Extending from the transmitting member 30 into the opening 32 are four bars 36. Connected to each of the bars 36 and disposed within the opening 32 is a central plate 38. Vertical force is transmitted from the transmitting member 30 through the bars 36 to the central plate 38.

Disposed below the central plate 38 is a conventional air spring 42 (shown schematically in FIGS. 2 and 3). The air spring 42 is attached to the central plate 38 and to the tractor 18. The air spring 42 transmits vertical force from the central plate 38 to the tractor 18. The air spring 42 is yieldable and is adjustable by variation of the inflation pressure within the air spring 42. Variation of the inflation pressure within the air spring 42 adjusts its spring rate. Adjustment of the spring rate allows the fifth wheel hitch 12 to be adjusted to a standard operating displacement from the tractor 18, prior to travel upon a road, even though the load in the trailer 22 may vary. Thus, the air spring 42 is adjustable to position the trailer 22 relative to the tractor 18 even though the cargo load in the trailer 22 may vary. During travel of the tractor 18 and trailer 22, the air spring 42 provides a force resisting vertical movement of the fifth wheel hitch 12 and the trailer 22 relative to the tractor 18.

A first hydraulic actuator 56 acts between the tractor 18 and the central plate 38. The first hydraulic actuator 56 includes a cylinder 58 (FIG. 3) attached to the tractor 18 by a pivotal connection 60. Thus, minor shifting between the fifth wheel hitch 12 and the tractor 18 can be accommodated.

Disposed within the cylinder 58 is a movable piston 68 which divides the cylinder 58 into an upper chamber 62 and a lower chamber 64. Each of the upper and lower chambers 62 and 64 are filled with a hydraulic fluid. The movable piston 68 is fixedly attached by a piston rod 70 to the central plate 38.

Hydraulic lines 72 and 74 are connected with the upper and lower chambers 62 and 64. The hydraulic lines 72 and 74 provide for fluid communication between the first hydraulic actuator 56 and an actuator control 76 (FIG. 1). The actuator control 76 includes a first servo valve 78. The first servo valve 78 regulates flow of the hydraulic fluid to and from the first hydraulic actuator 56. The first servo valve 78 has a central neutral position shown in FIG. 1, in which the first servo valve 78 blocks fluid flow to and from the first hydraulic actuator 56. The first servo valve 78 is movable from the central neutral position to infinitely variably control flow of hydraulic fluid to and from the first hydraulic actuator 56.

The first servo valve 78 is connected with hydraulic lines 80 and 82. The hydraulic line 80 is connected to a hydraulic pump 84. The hydraulic pump 84 provides a supply of pressurized hydraulic fluid. An accumulator 88 is provided on the output of the hydraulic pump 84. The hydraulic line 82 is connected with a reservoir 90. The reservoir 90 provides a supply of hydraulic fluid for the hydraulic pump 84.

Figure 3:
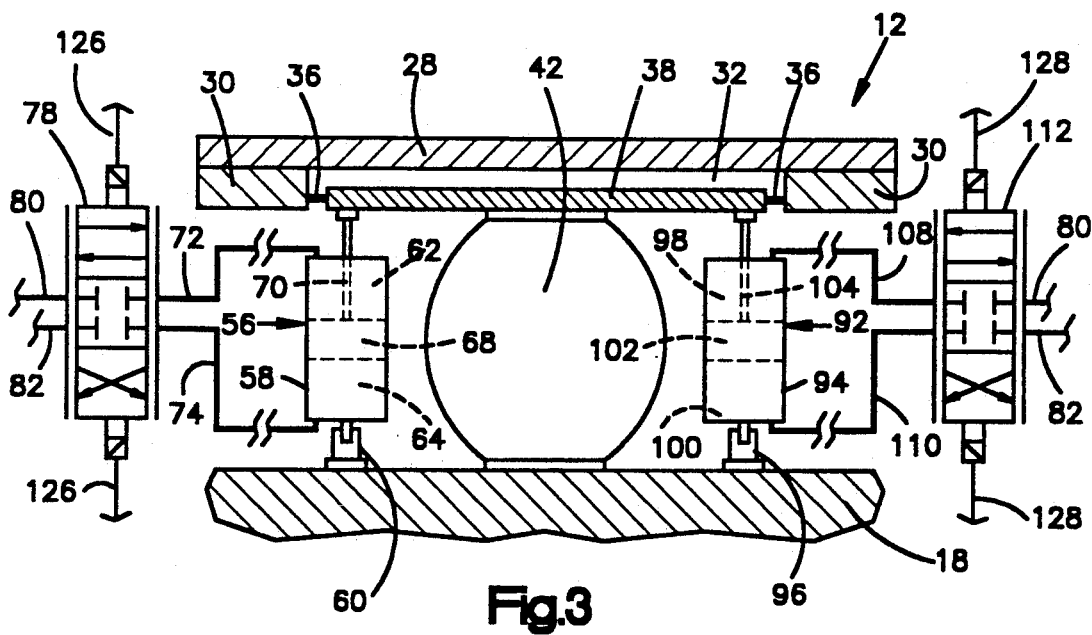
FIG. 3 is a sectional schematic illustration taken along line 3—3 of FIG. 2.

The first servo valve 78, when moved in a downward direction as viewed in FIG. 3 from the central neutral position, provides a connection between the hydraulic line 80 and the hydraulic line 72 and also provides a connection between the hydraulic line 82 and the hydraulic line 74. Thus, the upper chamber 62 (FIG. 3) of the first hydraulic actuator 56 is permitted to receive hydraulic fluid from the hydraulic pump 84 and hydraulic fluid from the lower chamber 64 is permitted to be returned to the reservoir 90.

The first servo valve 78, when moved in an upward direction as viewed in FIG. 3 from the central neutral position, provides a connection between the hydraulic line 80 and the hydraulic line 74 and also provides a connection between the hydraulic line 82 and the hydraulic line 72. Thus, the lower chamber 64 (FIG. 3) of the first hydraulic actuator 56 is permitted to receive hydraulic fluid from the hydraulic pump 84 and hydraulic fluid from the upper chamber 62 is permitted to be returned to the reservoir 90.

A second hydraulic actuator 92 (FIGS. 2 and 3) acts between the central plate 38 and the tractor 18. The second hydraulic actuator 92 is similar in construction and operation to the first hydraulic actuator 56. The second hydraulic actuator 92 includes a cylinder 94 (FIG. 3) attached to the tractor 18 by a pivotal connection 96. Thus, minor shifting between the fifth wheel hitch 12 and the tractor 18 can be accommodated.

Disposed within the cylinder 94 is a movable piston 102 which divides the cylinder 94 into an upper chamber 98 and a lower chamber 100. The upper and lower chambers 98 and 100 are filled with hydraulic fluid. The movable piston 102 is fixedly attached to the central plate 38 by a piston rod 104.

Hydraulic lines 108 and 110 are connected to the upper and lower chambers 98 and 100. The hydraulic lines 108 and 110 extend to a second servo valve 112 of the actuator control 76. The second servo valve 112 is similar in operation to that of the first servo valve 78. The second servo valve 112 controls flow of hydraulic fluid to and from the second hydraulic actuator 92. The second servo valve 112 is connected to the hydraulic lines 80 and 82 for receiving hydraulic fluid from the hydraulic pump 84 and for returning hydraulic fluid to the reservoir 90.

An electrical strain gauge sensor 118 (FIG. 2) comprises a strain gauge or gauges mounted on one or more of the bars 36. The strain gauge sensor 118 measures the strain in the bars 36 under the vertical force from the trailer 22. An electrical connector 120 connects the strain gauge sensor 118 to an electronic control unit (ECU) 124 (FIG. 1).

The apparatus 10 also includes a displacement sensor 134 (FIG. 1) for detecting a vertical distance between the tractor 18 and the fifth wheel hitch 12. A sensor connector 136 connects the displacement sensor 134 to the ECU 124. The displacement sensor 134 provides positional distance information which is used by the ECU 124 for operating the first and second servo valves 78 and 112.

The displacement sensor 134 also provides positional distance information which is used by the ECU 124 to vary the inflation pressure of the air spring 42. The variation of the inflation pressure of the air spring 42 allows the fifth wheel hitch 12 to be adjusted to the standard operating displacement from the tractor 18, prior to travel, as noted above. The ECU 124 controls a means (not shown in the figures) for the variation of inflation pressure of the air spring 42.

The movement of the fifth wheel hitch 12 and the trailer 22 is permitted by the ECU 124 controlling the first and second servo valves 78 and 112 to move from their central neutral positions. If the first and second hydraulic actuators 56 and 92 prevent the movement of the fifth wheel hitch 12 in a downward direction, the ECU 124 controls the first and second servo valves 78 and 112 to move downwardly from their central neutral positions to permit hydraulic fluid to enter the upper chambers 62 and 98 and exit the lower chambers 64 and 100. If the first and second hydraulic actuators 56 and 92 prevent the movement of the fifth wheel hitch 12 in an upward direction, the ECU 124 controls the first and second servo valves 78 and 112 to move upwardly from their central neutral positions to permit hydraulic fluid to enter the lower chambers 64 and 100 and exit the upper chambers 62 and 98. Once the inflation pressure of the air spring 42 is adjusted such that the fifth wheel hitch 12 is at the standard operating displacement from the tractor 18, the variation of the inflation pressure is ceased and the first and second servo valves 78 and 112 are returned to their central neutral positions.

In a stationary condition (i.e., when the trailer 22 is not being pulled by the tractor 18 thereby subjecting the trailer 22 to varying road conditions), the magnitude of the vertical force transmitted from the trailer 22 to the tractor 18 through the fifth wheel hitch is dependent upon the weight of the trailer 22 and the weight of any cargo in the trailer 20. This force is termed herein to be the normal vertical force. The trailer 22 rests on the fifth wheel hitch plate 28. The normal vertical force is transmitted through the transmitting member 30 to the bars 36. The normal vertical force is then transmitted to the central plate 38 and the air spring 42.

The bars 36 are strained by the normal vertical force. Thus, the strain gauge sensor 118 provides a signal indicative of the normal vertical force through the electrical connection 120 (FIG. 1) to the ECU 124. The ECU 124 stores information regarding the signal indicative of the normal vertical force.

A change in the vertical force transmitted from the trailer 2 through the fifth wheel hitch 12 to the tractor 18 causes the strain on the bars 36 (FIG. 2) to change. A change of strain on the bars 36 causes the strain gauge sensor 118 to produce an electrical signal indicative of the new vertical force transmitted from the trailer 22 through the fifth wheel hitch 12 to the tractor 18. The ECU 124 (FIG. 1) receives the signal indicative of the new vertical force from the strain gauge sensor 118 through the electrical connection 120.

The ECU 124 processes the signal indicative of the new vertical force from the strain gauge sensor 118. The ECU 124 makes a comparison of the new vertical force and the normal vertical force. The ECU 124 will thus determine the change in the vertical force. Based on the change, the ECU 124 will control the operation of the first servo valve 78 via control connectors 126, and will control operation of the second servo valve 112 via control connectors 128.

The ECU 124 determines whether to move the first servo valve 78 up or down from its central neutral position. The ECU 124 also determines the amount of displacement of the first servo valve 78 in either the up or down direction. Increased displacement of the first servo valve 78 from the central neutral position causes an increased volume of hydraulic fluid to flow from the hydraulic pump 84 to one of the upper or lower chambers 62, 64 and an increased flow to the reservoir 90 from the other of the upper or lower chambers 62, 64. The amount of displacement of the first servo valve 78 as determined by the ECU 124 is dependent on the magnitude of the change in vertical force transmitted from the trailer 22 through the fifth wheel hitch 12.

The second servo valve 112 (FIGS. 2 and 3) is operated by the ECU 124 similarly to the operation of the first servo valve 78. The operation of the second servo valve 112 controls flow of the hydraulic fluid to and from the second hydraulic actuator 92.

In the preferred embodiment the ECU 124 would only control the first and second servo valves 78 and 112 for reducing the magnitude of changes in vertical force transmitted to the tractor 18 from the trailer 22 through the fifth wheel hitch 12 during pulling of the tractor 22 by the trailer 18. The ECU 124 could be disabled or shut off for periods of loading/unloading or parking. The ECU 124 could be disabled by either a control or switch which is accessible to an operator of the tractor 18 or by a switch which responds to the speed of the tractor and disables the ECU 124 at low tractor speeds. The ECU 124 operation for the purpose of varying the inflation pressure of the air spring 42 and movement of the first and second servo valves 78 and 112 for adjustment of the fifth wheel hitch 12 to the standard operating displacement is performed when the ECU 124 is enabled.

In operation, if the road conditions do not cause the trailer 22 to tend to move upwardly or downwardly from the standard operating displacement, the vertical force transmitted from the trailer 22 through the fifth wheel hitch 12 to the tractor 18 remains constant. The bars 36 remain strained at a constant amount. The strain gauge sensor 118 will provide a signal to the ECU 124 which is constant. The ECU 124 determines that movement of the first and second servo valves 56 and 92 is not required. Thus, the first and second servo valves 78 and 112 remain in their central neutral positions. The flow of hydraulic fluid to and from the first and second hydraulic actuators 56 and 92 is blocked. The air spring 42 supports the trailer 2 and transmits the normal vertical force to the tractor 18.

If the road conditions cause the trailer 22 to tend to move downwardly against the fifth wheel hitch 12, moving the fifth wheel hitch 12 down from the standard operating displacement, the vertical force transmitted to the tractor 18 from the trailer 22 increases. The bars 36 (FIGS. 2 and 3) are further strained under the increased vertical force. The strain gauge sensor 118 senses the increased vertical force and provides a signal indicative of the increased vertical force to the ECU 124 (FIG. 1).

The ECU 124 receives the signal indicative of the increased vertical force, determines the change in vertical force, and calculates the movement of the first and second servo valves 78 and 112. The first and second servo valves 78 and 112 (FIG. 3) are moved downwardly. The amount of movement of the first and second servo valves 78 and 112 in the downward direction will be dependent on the magnitude of the change in the vertical force, a greater magnitude of change will necessitate a greater amount of movement.

The downward movement of the first and second servo valves 78 and 112 permits hydraulic fluid from the hydraulic pump 84 to enter the upper chambers 62 and 98 of the first and second hydraulic actuators 56 and 92. Hydraulic fluid is simultaneously permitted to exit the lower chambers 64 and 100 of the first and second hydraulic actuators 56 and 92 and returned to the reservoir 90. The flow of hydraulic fluid to and from the first and second hydraulic actuators 56 and 92 is restricted or metered such that the first and second hydraulic actuators 56 and 92 provide a restrictive or resistive force to movement of the fifth wheel hitch 12. The restricting or metering of the flow of hydraulic fluid dissipates vertical force applied by the trailer to the fifth wheel hitch 12.

A substantial portion of the change in magnitude in vertical force is dissipated over a portion of time because of the elastic properties of the air spring 42 and the restrictive or resistive vertical force applied by the first and second hydraulic actuators 56 and 92 to the fifth wheel hitch 12. A substantial portion of the change in vertical force is dissipated against the resistive force of the air spring 42 and the restrictive or resistive vertical force applied by the first and second hydraulic actuators 56 and 92 due to the metered flow of hydraulic fluid from the actuators.

As the trailer 22 moves downwardly, the change in vertical force is reduced. The strain on the bars 36 is reduced. The strain gauge sensor 118 senses the reduction in the change in vertical force and provides a signal indicative of the reduction in change in vertical force to the ECU 124. The ECU 124 processes the signal indicative of the reduction in change in vertical force and controls the first and second servo valves 78 and 112 to move upwardly toward their central neutral position. The flow of hydraulic fluid to and/or from the first and second hydraulic actuators 56 and 92 continues to be restricted.

As the change in vertical force of the trailer 22 continues to be dissipated, the strain on the bars 36 continues to be reduced and the ECU 124 continues to move the first and second servo valves 78 and 112 toward their central neutral position. After the change in magnitude of the vertical force has been reduced to a level which approximates the normal vertical force, the first and second servo valves 78 and 112 are moved to their central neutral positions to stop the flow of hydraulic fluid to and from the first and second hydraulic actuators 56 and 92. The downward movement of the trailer 22 is ceased.

The trailer 22 is then moved upwardly to return to the standard operating displacement by the air spring 42 in a rebounding action. This upward movement is permitted by the ECU 124 controlling the first and second servo valves 78 and 112 to move upward from their central neutral positions. Hydraulic fluid is permitted to enter the lower chambers 64 and 100 and exit the upper chambers 62 and 98. If necessary, the ECU 124 can control the servo valves 78 and 112, such that they may be moved sufficiently upwardly from their central neutral position to cause the hydraulic fluid to enter the lower chambers 64 and 100 under pressure to push upwardly on the pistons 68 and 102 to assist in the upward movement of the fifth wheel hitch 12 and the trailer 22. Thus, the fifth wheel hitch 12 and trailer 22 are moved upwardly to the standard operating displacement. After the fifth wheel hitch 12 is moved to the standard operating displacement, the first and second servo valves 78 and 112 are moved to their central neutral positions.

If the road conditions are such that the trailer 22 (FIG. 1) is caused to tend to move upwardly relative to the tractor 18, causing the fifth wheel hitch 12 to move up from the standard operating displacement, the vertical force transmitted to the tractor 18 from the trailer 22 through the fifth wheel hitch 12 is decreased from the normal vertical force. The strain on the bars 36 (FIGS. 2 and 3) is reduced from the strain associated with the normal vertical force. The strain gauge sensor 118 senses the new vertical force and provides a signal indicative of the new force to the ECU 124 (FIG. 1).

The ECU 124 receives the signal from the strain gauge sensor 118 and determines the change in the vertical force from the normal vertical force. The ECU 124 calculates the amount of movement of the first and second servo valves 78 and 112 (FIG. 3). The first and second servo valves 78 and 112 are moved upwardly. The amount of movement of the first and second servo valves 78 and 112 in the upward direction will depend on the magnitude of the change in vertical force, a greater magnitude of change will necessitate a greater amount of movement.

The upward movement of the first and second servo valves 78 and 112 permits hydraulic fluid to enter the lower chambers 64 and 100 of the first and second hydraulic actuators 56 and 92. Simultaneously, hydraulic fluid is permitted to exit the upper chambers 62 and 98 of the first and second hydraulic actuators 56 and 92 and return to the reservoir 90. The flow of hydraulic fluid to and/or from the first and second hydraulic actuators 56 and 92 is restricted or metered such that the first and second hydraulic actuators 56 and 92 provide a restrictive or resistive force to movement of the fifth wheel hitch 12. The restricting or metering of the flow of hydraulic fluid dissipates vertical force from the trailer transmitted through the fifth wheel hitch 12.

The impact of the change in vertical force is dissipated over time because of the elastic properties of the air spring 42 and the restrictive or resistive vertical force applied by the first and second hydraulic actuators 56 and 92 to the fifth wheel hitch 12. A substantial portion of the change in magnitude of vertical force is dissipated against the resistive force of the air spring 42 and the restrictive or resistive vertical force applied by the first and second hydraulic actuators 56 and 92.

As the trailer 22 moves upwardly, the change in vertical force is reduced. The strain on the bars 36 approaches the strain associated with the normal vertical force. The strain gauge sensor 118 senses the reduction in the change in vertical force and provides a signal indicative of the reduction in change in vertical force to the ECU 124. The ECU 124 processes the signal indicative of the reduction in change in vertical force and controls the first and second servo valves 78 and 112 to move downwardly toward their central neutral positions. The flow of hydraulic fluid from the first and second hydraulic actuators 56 and 92 continues to be restricted.

As the change in vertical force of the trailer 22 continues to be dissipated, the strain on the bars 36 continues to increase toward the strain associated with the normal vertical force. Also, the ECU 124 continues to move the first and second servo valves 78 and 112 toward their central neutral positions. After the change in vertical force has been decreased to a level which approximates the normal vertical force, the first and second servo valves 78 and 112 are closed to stop the flow of hydraulic fluid to and from the first and second hydraulic actuators 56 and 92. The upward movement of the fifth wheel hitch 12 and the trailer 22 is ceased.

The trailer 22 is then moved downwardly to return to the standard operating displacement by the air spring 42 in a rebounding action. This downward movement is permitted by the ECU 124 controlling the first and second servo valves 78 and 112 to move downwardly from their central neutral positions. Hydraulic fluid is permitted to enter the upper chambers 62 and 98 and exit the lower chambers 64 and 100. The rebounding action of the air spring 42 is assisted by the natural gravitational propensity of the trailer 22 to move downwardly. Thus, the fifth wheel hitch 12 is moved downwardly to the standard operating displacement. The return movement of the trailer 22 could be assisted by the first and second hydraulic actuators 56 and 92. After the fifth wheel hitch 12 is moved to the standard operating displacement, the first and second servo valves 78 and 112 are moved to their central neutral positions.

The ECU 124 can be programmed to control the first and second servo valves 78 and 112 in a variety of ways. The amount that the servo-valves 78 and 112 move in response to a change in vertical force due to trailer 22 movement can be adjusted to vary the amount of control provided by the first and second hydraulic actuators 56 and 92. Also, the ECU 124 can be programmed to take into account variations that are associated with the particular tractor 18 and trailer 22, i.e., such as the air spring 42 being abnormally stiff. Moreover, the first and second hydraulic actuators 56 and 92 can be controlled to compensate for a variety of other trailer movements. Therefore, the apparatus could also be used to compensate for forces tending to cause roll over which are initiated by the trailer 22.

Additionally, the apparatus 10 could also be utilized to raise or lower the fifth wheel hitch 12 to facilitate various operations, such as connection of the trailer 22 to the fifth wheel hitch plate 28. The raising of the fifth wheel hitch plate 12 is accomplished by moving the first and second servo valves 78 and 112 upwardly from their neutral positions. The first and second servo valves 78 and 112 thereby provide pressurized hydraulic fluid from the hydraulic pump 84 to the lower chambers 64 and 100, which will pressurize the lower chambers 64 and 100 to move the pistons 68 and 102 upwardly.

The lowering of the fifth wheel hitch plate 12 is accomplished by moving the first and second servo valves 78 and 12 downwardly from their central neutral positions. The first and second servo valves 78 and 112 thereby provide pressurized hydraulic fluid from the hydraulic pump 84 to the upper chambers 62 and 98, which will pressurize the upper chambers 62 and 98 to move the pistons 68 and 102 downwardly.

The apparatus 10 may also include an accelerometer 140 (FIG. 1) mounted on the trailer 22. The accelerometer 140 is connected to the ECU 124 by a sensor connection 142. The accelerometer 140 senses acceleration of the trailer 22 in a vertical direction.

An accelerometer 146 is mounted on the tractor 18. The accelerometer 146 is connected to the ECU 124 by a sensor connection 148. The accelerometer 146 senses acceleration of the tractor 18 in the vertical direction. The accelerometers 140 and 146 provide additional information to the ECU 124 for controlling the first and second servo valves 78 and 112. This information is indicative of the rate of change in force applied, by the trailer 22 and the tractor 18, to the fifth wheel hitch 12.

The information provided by the accelerometers 140 and 146 is utilized to determine whether a change in the vertical force transmitted through the fifth wheel hitch 12 is initiated by the tractor 18, such as when the wheels of the tractor 18 encounter uneven pavement, or initiated by the trailer 22. In the instance that the tractor 18 encounters uneven pavement, the tractor 18 will tend to be accelerated up or down in the vertical direction, thus, the change in force transmitted through the fifth wheel hitch 12 is initiated by the tractor 18. The ECU 124 can utilize the information provided by the accelerometers 140 and 146 to determine that operational movement of the first and second servo valves 78 and 112 is not necessary because the ride and handling of the tractor 18 is already effected.

In another embodiment, the accelerometers 140 and 146 could be used as the sensing means for sensing changes in the vertical force transmitted to the tractor 18 by the trailer 22 through the fifth wheel hitch 12, as the mass of the trailer 22 is accelerated toward or away from the tractor 18 instead of the strain gauge sensor 118.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for reducing the magnitude of changes in a vertical force transmitted to a tractor from a trailer through a fifth wheel hitch, the changes in the vertical force being caused by the trailer reacting as an inertial mass as the trailer is moved over uneven pavement during the pulling of the trailer by the tractor, said apparatus comprising:

means for providing a signal indicative of the vertical force transmitted from the trailer through the fifth wheel hitch;

actuator means disposed between the fifth wheel hitch and the tractor for applying vertical force to the fifth wheel hitch and the tractor; and control means for operating said actuator means for varying the amount of vertical force applied to the fifth wheel hitch by the actuator means in response to the signal indicative of the vertical force transmitted to the tractor from the trailer through the fifth wheel hitch, said control means including means for reducing the vertical force applied by said actuator means in response to increased vertical force transmitted to the tractor from the trailer through the fifth wheel hitch and for increasing the vertical force applied by said actuator means in response to decreased vertical force transmitted to the tractor from the trailer through the fifth wheel hitch.

2. An apparatus as set forth in claim 1 wherein said actuator means includes a hydraulic actuator for applying force to the fifth wheel hitch.

3. An apparatus as set forth in claim 2 including hydraulic pump means for supplying fluid to said hydraulic actuator, said control means including valve means for regulating fluid flow between said hydraulic pump means and said hydraulic actuator.

4. An apparatus as set forth in claim 3 wherein said control means includes processor means for controlling said valve means responsive to the signal indicative of the vertical force transmitted from the trailer through the fifth wheel hitch.

5. An apparatus as set forth in claim 3 wherein said actuator means includes a plurality of hydraulic actuators for applying force to the fifth wheel hitch.

6. An apparatus as set forth in claim 5 wherein said control means including a plurality of valve means for regulating fluid flow between said hydraulic pump means and said plurality of hydraulic actuators.

7. An apparatus as set forth in claim 1 including a position sensor for sensing changes in a distance between the fifth wheel hitch and the tractor.

8. An apparatus as set forth in claim 7 wherein said control means also varies the amount of vertical force applied to the fifth wheel hitch responsive to sensed changes in the distance between the fifth wheel hitch and the tractor for moving the fifth wheel hitch to a standard operating displacement from the tractor.

9. An apparatus as set forth in claim 1 including support means for yieldably supporting the fifth wheel hitch and a portion of the trailer on the tractor and for providing a force resisting vertical movement of the fifth wheel hitch and the trailer relative to the tractor.

10. An apparatus for reducing the magnitude of changes in a vertical force transmitted to a tractor from a trailer through a fifth wheel hitch, the changes in the vertical force being caused by the trailer reacting as an inertial mass as the trailer is moved over uneven pavement during the pulling of the trailer by the tractor, said apparatus comprising:

means for providing a signal indicative of the vertical force transmitted from the trailer through the fifth wheel hitch, said means for providing a signal including an electrical strain gauge;

actuator means disposed between the fifth wheel hitch and the tractor for applying vertical force to the fifth wheel hitch and the trailer; and control means for operating said actuator means for varying the amount of vertical force applied to the fifth wheel hitch by the actuator means responsively to said signal indicative of the vertical force transmitted to the tractor from the trailer through the fifth wheel hitch.

11. An apparatus for reducing the magnitude of changes in a vertical force transmitted from a trailer, connected to a fifth wheel hitch of a moving tractor, to the tractor through the fifth wheel hitch, the changes in the vertical force being caused by the trailer reacting as an inertial mass as the trailer is moved over uneven pavement during pulling of the trailer by the tractor, said apparatus comprising:

sensor means for sensing variations in conditions corresponding to changes in the vertical force transmitted from the trailer to the tractor;

actuator means for applying a variable amount of vertical force to the trailer and the tractor; and control means for effecting operation of said actuator means in response to variations sensed by the sensor means to vary the amount of vertical force applied by the actuator means for reducing the magnitude of changes in the vertical force transmitted from the trailer to the tractor, said control means includes means for reducing the vertical force applied by said actuator means in response to the trailer tending to move downwardly relative to the tractor and for increasing the vertical force applied by said actuator means in response to the trailer tending to move upwardly relative to the tractor.

12. An apparatus as set forth in claim 11, wherein said actuator means includes a hydraulic actuator, said means for reducing the vertical force applied by said actuator means in response to the trailer tending to move downwardly relative to the tractor and for increasing the vertical force applied by said actuator means in response to the trailer tending to move upwardly relative to the tractor including valve means for controlling flow of pressurized hydraulic fluid from a source to said hydraulic actuator.

13. An apparatus as set forth in claim 12, wherein said actuator means including a cylinder, connected to the tractor, and a piston, connected to the fifth wheel hitch, dividing said cylinder into upper and lower chambers, said control means including means for operating said valve means to direct pressurized hydraulic fluid from the source into said upper chamber of said cylinder for reducing the vertical force applied by said actuator means in response to increased vertical force transmitted to the tractor from the trailer through the fifth wheel hitch and said control means including means for operating said valve means to direct pressurized hydraulic fluid from the source into said lower chamber of said cylinder for increasing the vertical force applied by said actuator means in response to decreased vertical force transmitted to the tractor from the trailer through the fifth wheel hitch.

* * * * *